(12) United States Patent
Chen et al.

(10) Patent No.: US 11,561,129 B2
(45) Date of Patent: Jan. 24, 2023

(54) VIBRATION SENSING ASSEMBLY FOR BONE CONDUCTION MICROPHONE

(71) Applicant: Merry Electronics(Shenzhen) Co., Ltd., ShenZhen (CN)

(72) Inventors: Jen-Yi Chen, Taichung (TW); Yueh-Kang Lee, Taichung (TW); Chao-Sen Chang, Taichung (TW); Kai-Yu Jiang, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 0 days.

(21) Appl. No.: 17/381,207

(22) Filed: Jul. 21, 2021

(65) Prior Publication Data
US 2022/0404196 A1 Dec. 22, 2022

(30) Foreign Application Priority Data
Jun. 18, 2021 (TW) ................................ 110122338

(51) Int. Cl.
| | | |
|---|---|---|
| *G01H 11/06* | (2006.01) | |
| *H04R 1/04* | (2006.01) | |
| *H04R 19/04* | (2006.01) | |

(52) U.S. Cl.
CPC ............ *G01H 11/06* (2013.01); *H04R 1/04* (2013.01); *H04R 19/04* (2013.01); *H04R 2201/003* (2013.01)

(58) Field of Classification Search
CPC .... B81B 2201/0257; B81B 2203/0127; B81B 7/0061; G01H 11/06; G01H 3/00; H04R 1/04; H04R 19/04; H04R 2201/003; H04R 3/00; H04R 7/04
See application file for complete search history.

(56) References Cited

U.S. PATENT DOCUMENTS

| | | | |
|---|---|---|---|
| 2017/0111721 A1* | 4/2017 | Miehl .................... | H04M 1/035 |
| 2021/0400366 A1* | 12/2021 | Lopresti ................. | H04R 19/04 |
| 2022/0169499 A1* | 6/2022 | Lafort ...................... | B81B 7/02 |
| 2022/0349745 A1* | 11/2022 | Hong ..................... | H04R 19/04 |

FOREIGN PATENT DOCUMENTS

| | | | | |
|---|---|---|---|---|
| CN | 106608613 A | * | 5/2017 | |
| CN | 108513241 A | * | 9/2018 | ............. G01H 11/06 |
| CN | 110972045 A | * | 4/2020 | ............. G01H 17/00 |

(Continued)

*Primary Examiner* — David L Singer
(74) *Attorney, Agent, or Firm* — JCIPRNET (57) ABSTRACT

A vibration sensing assembly, including a base, a side shell, a sensor, an upper cover, and a diaphragm assembly, is provided. The base includes first and second bottom plates. A first cavity is formed between the first and second bottom plates. The second bottom plate includes first and second through holes. The side shell is disposed on the second bottom plate and includes a cylinder and an inner partition. The inner partition divides the cylinder into a second cavity and an airflow channel. The airflow channel is communicated with the first cavity through the first through hole. The sensor is disposed in the second cavity and covers the second through hole. The side shell is located between the base and the upper cover. The base, the side shell, and the upper cover jointly form an outer shell. The diaphragm assembly is disposed between the side shell and the upper cover.

19 Claims, 13 Drawing Sheets

(56) References Cited

FOREIGN PATENT DOCUMENTS

| | | | | | |
|---|---|---|---|---|---|
| CN | 210464558 | U | * | 5/2020 | ........... G01D 11/245 |
| CN | 210641062 | U | * | 5/2020 | |
| CN | 111988717 | A | * | 11/2020 | |
| CN | 212393006 | U | * | 1/2021 | |
| CN | 112333618 | A | * | 2/2021 | ............. H04R 23/00 |
| CN | 213280084 | U | * | 5/2021 | |
| CN | 112887884 | A | * | 6/2021 | ........... H04R 19/005 |
| CN | 213694143 | U | * | 7/2021 | |
| CN | 213694145 | U | * | 7/2021 | |
| CN | 113411731 | A | * | 9/2021 | |
| CN | 215187377 | U | * | 12/2021 | |
| TW | I549522 | B | * | 9/2016 | |
| WO | WO-2022000794 | A1 | * | 1/2022 | |

\* cited by examiner

VIBRATION SENSING ASSEMBLY FOR BONE CONDUCTION MICROPHONE

CROSS-REFERENCE TO RELATED APPLICATION

This application claims the priority benefit of Taiwan application serial no. 110122338, filed on Jun. 18, 2021. The entirety of the above-mentioned patent application is hereby incorporated by reference herein and made a part of this specification.

BACKGROUND

Technical Field

The disclosure relates to a sensing assembly, and particularly relates to a vibration sensing assembly.

Description of Related Art

With the advancement of science and technology, the performance and precision requirements of the vibration sensing assembly are increasing. How to provide a vibration sensing assembly with good performance is a research goal in the art.

SUMMARY

The disclosure provides a vibration sensing assembly, which has better performance.

A vibration sensing assembly of the disclosure includes a base, a side shell, a sensor, an upper cover, and a diaphragm assembly. The base includes a first bottom plate, a second bottom plate located above the first bottom plate and separated from the first bottom plate, and a first cavity formed between the first bottom plate and the second bottom plate. The second bottom plate includes a first through hole and a second through hole communicated with the first cavity. The side shell is disposed on the second bottom plate and includes a cylinder and an inner partition located in the cylinder. The inner partition divides the cylinder into a second cavity and an airflow channel. The airflow channel is communicated with the first cavity through the first through hole. The sensor is disposed in the second cavity and covers the second through hole of the second bottom plate. The side shell is located between the base and the upper cover. The base, the side shell, and the upper cover jointly form an outer shell of the vibration sensing assembly. The diaphragm assembly is disposed between the side shell and the upper cover. A third cavity is formed between the diaphragm assembly and the upper cover, and the third cavity is communicated with the airflow channel.

In an embodiment of the disclosure, the vibration sensing assembly further includes a control chip disposed in the second cavity and electrically connected to the sensor. The first bottom plate is a circuit board. The control chip is electrically connected to the circuit board.

In an embodiment of the disclosure, the base further includes a spacer located between the first bottom plate and the second bottom plate. The spacer includes a void. The first bottom plate is a circuit board. The control chip is electrically connected to the circuit board through passing through a route of the void.

In an embodiment of the disclosure, the base further includes a spacer located between the first bottom plate and the second bottom plate. The spacer includes a via hole. The first bottom plate is a circuit board. The control chip is electrically connected to the circuit board through the via hole.

In an embodiment of the disclosure, the base further comprises a spacer located between the first bottom plate and the second bottom plate, the spacer is made of a conductive material, the first bottom plate is a circuit board, and the control chip is electrically connected to the circuit board through the spacer.

In an embodiment of the disclosure, the vibration sensing assembly further includes a buffer disposed on a surface of the control chip. The surface faces the diaphragm assembly.

In an embodiment of the disclosure, the diaphragm assembly includes a diaphragm and a mass block fixed to the diaphragm. The mass block is located in the second cavity.

In an embodiment of the disclosure, a projection range of the upper cover on a plane where the diaphragm assembly is located is same as a range of the diaphragm assembly.

In an embodiment of the disclosure, the diaphragm assembly includes a perforation corresponding to the airflow channel.

In an embodiment of the disclosure, a projection range of a part surrounding the second cavity in the side shell on a plane where the diaphragm assembly is located is same as a range of the diaphragm assembly.

In an embodiment of the disclosure, the diaphragm assembly includes a diaphragm and a mass block and an annulus connector fixed to the diaphragm. The annulus connector surrounds the mass block and has same height as the mass block. The diaphragm is connected to the part surrounding the second cavity in the side shell through the annulus connector.

In an embodiment of the disclosure, the annulus connector and the mass block are disposed at a bottom surface of the diaphragm, so that the annulus connector and the mass block face toward the sensor.

In an embodiment of the disclosure, the upper cover contacts the part surrounding the second cavity in the side shell.

In an embodiment of the disclosure, the diaphragm assembly comprises a diaphragm, a mass block and an annulus connector, the annulus connector and the mass block are disposed at a bottom surface of the diaphragm, so that the annulus connector and the mass block face toward the sensor, the upper cover is connected to a part surrounding the second cavity in the side shell through the diaphragm and the annulus connector sequentially.

In an embodiment of the disclosure, the diaphragm assembly comprises a diaphragm, a mass block and an annulus connector, the annulus connector and the mass block are disposed at a top surface of the diaphragm, so that the annulus connector and the mass block face toward the upper cover, the upper cover is connected to a part surrounding the second cavity in the side shell through the annulus connector and the diaphragm sequentially.

In an embodiment of the disclosure, the base further includes a spacer located between the first bottom plate and the second bottom plate. The spacer, the side shell, and the upper cover jointly form an electromagnetic protection structure.

In an embodiment of the disclosure, the airflow channel is disposed at a peripheral position of the side shell.

In an embodiment of the disclosure, the upper cover includes an upper cover opening. The upper cover opening is communicated with the third cavity.

Based on the above, the first cavity of the vibration sensing assembly of the disclosure is formed between the first bottom plate and the second bottom plate, the side shell is disposed on the second bottom plate, the inner partition of the side shell divides the cylinder into the second cavity and the airflow channel, and the airflow channel is communicated with the first cavity through the first through hole of the second bottom plate. The sensor is disposed in the second cavity and covers the second through hole of the second bottom plate. The side shell is located between the base and the upper cover, and the base, the side shell, and the upper cover jointly form the outer shell of the vibration sensing assembly. The diaphragm assembly is disposed between the side shell and the upper cover, the third cavity is formed between the diaphragm assembly and the upper cover, and the third cavity is communicated with the airflow channel. The first cavity of the vibration sensing assembly of the disclosure is communicated with the third cavity through the airflow channel to better balance the pressure in the first cavity and the third cavity, so that the movement of the diaphragm assembly is smoother to have better performance. In addition, the base, the side shell, and the upper cover jointly serve as the outer shell of the vibration sensing assembly, so that the vibration sensing assembly does not need an additional outer shell and has a smaller volume.

DETAILED DESCRIPTION OF DISCLOSED EMBODIMENTS

Figure 1A:
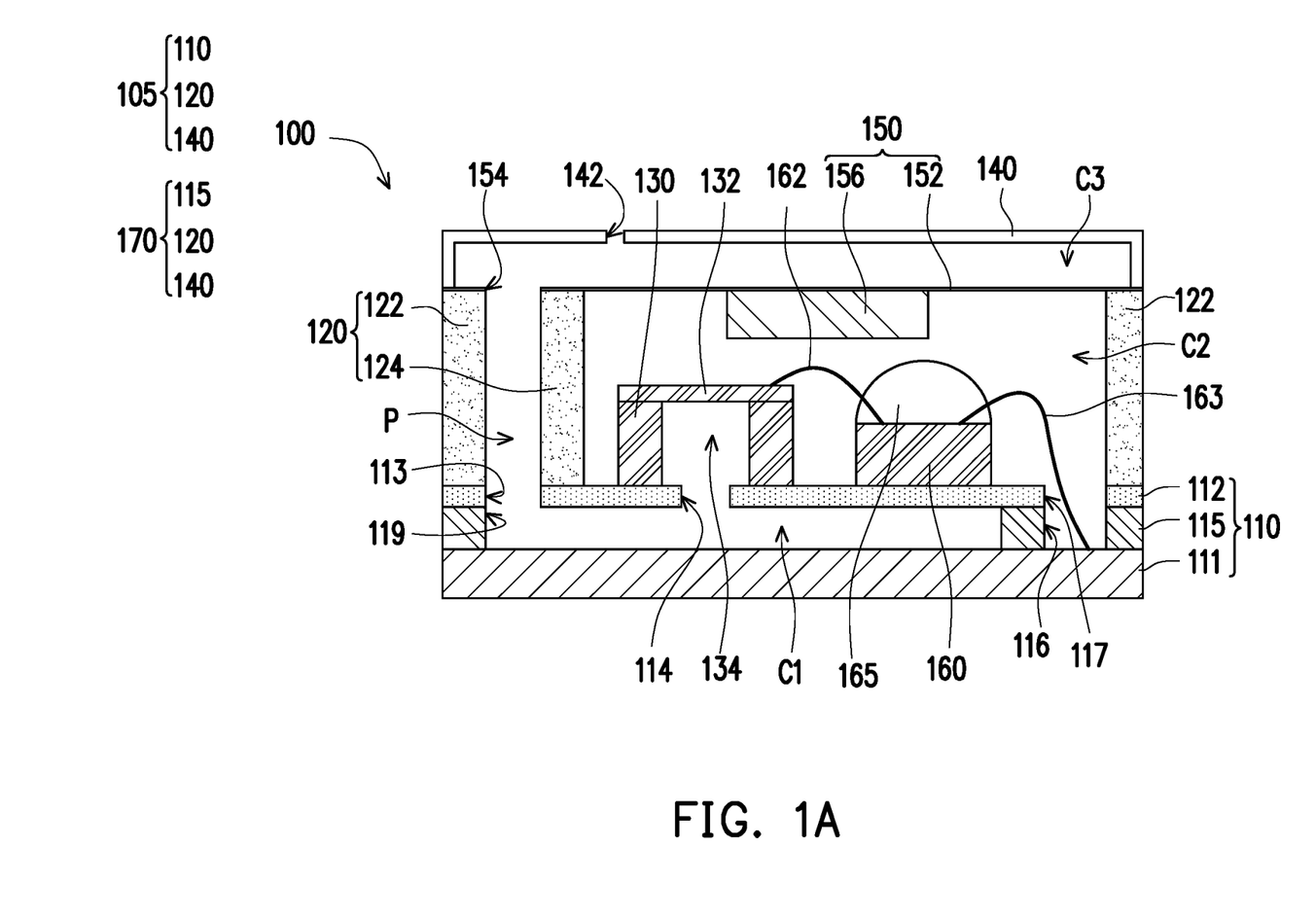
FIG. 1A is a schematic cross-sectional view of a vibration sensing assembly according to an embodiment of the disclosure.
Figure 1B:
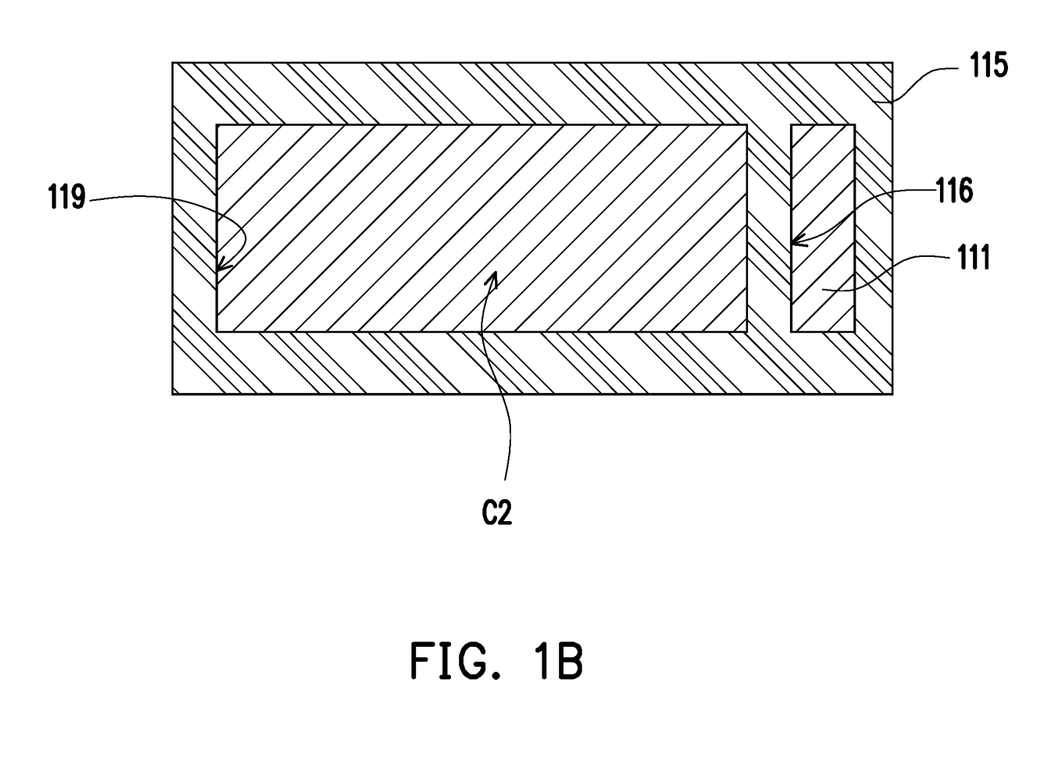
FIG. 1B is a schematic top view of a first bottom plate and a spacer of the vibration sensing assembly of FIG. 1A.
Figure 1C:
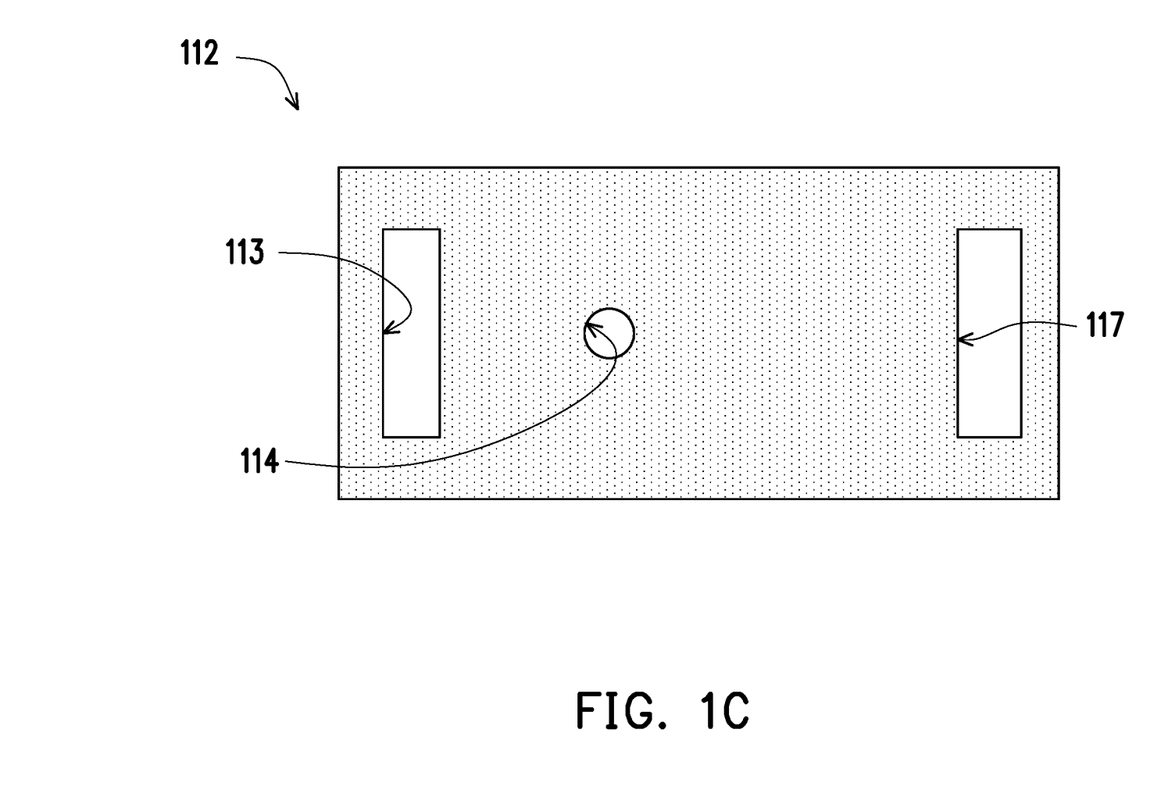
FIG. 1C is a schematic top view of a second bottom plate of the vibration sensing assembly of FIG. 1A.
Figure 1D:
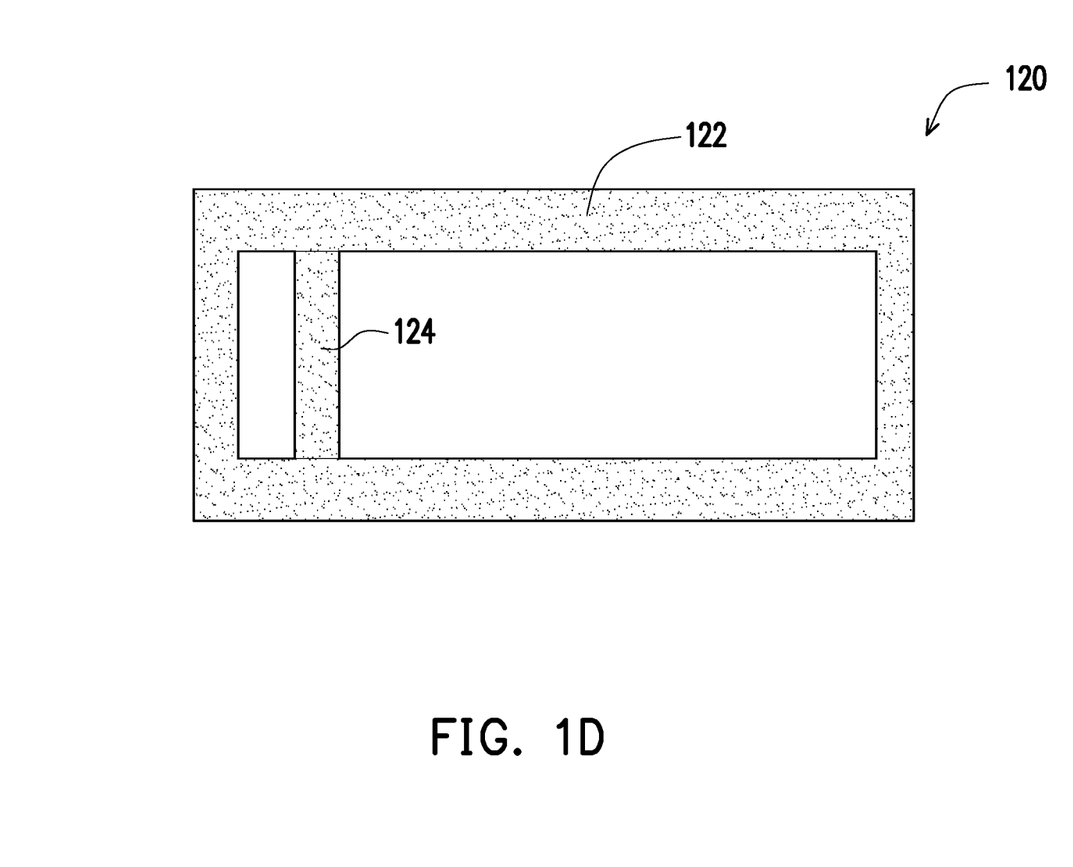
FIG. 1D is a schematic top view of a side shell of the vibration sensing assembly of FIG. 1A.

FIG. 1A is a schematic cross-sectional view of a vibration sensing assembly according to an embodiment of the disclosure. FIG. 1B is a schematic top view of a first bottom plate and a spacer of the vibration sensing assembly of FIG. 1A. FIG. 1C is a schematic top view of a second bottom plate of the vibration sensing assembly of FIG. 1A. FIG. 1D is a schematic top view of a side shell of the vibration sensing assembly of FIG. 1A.

Please refer to FIG. 1A to FIG. 1D. A vibration sensing assembly 100 of the embodiment includes a base 110, a side shell 120, a sensor 130, an upper cover 140, and a diaphragm assembly 150. The base 110 includes a first bottom plate 111 and a second bottom plate 112 located above the first bottom plate 111 and separated from the first bottom plate 111. The base 110 also includes a spacer 115 located between the first bottom plate 111 and the second bottom plate 112. The first bottom plate 111 and the second bottom plate 112 are separated by the spacer 115.

A first cavity C1 is formed between the first bottom plate 111 and the second bottom plate 112. As shown in FIG. 1A and FIG. 1C, the second bottom plate 112 includes a first through hole 113, a second through hole 114, and a third through hole 117 that are communicated with the first cavity C1. As shown in FIG. 1A and FIG. 1B, the spacer 115 includes a cavity hole 119 and a void 116. The cavity hole 119 surrounds the first cavity C1. The void 116 corresponds to the third through hole 117.

In the embodiment, the three-dimensional first cavity C1 is formed by the first bottom plate 111, the hollowed-out spacer 115, and the hollowed-out first bottom plate 111. In other words, the first cavity C1 may be assembled from multiple plate bodies to have a lower cost.

As shown in FIG. 1A and FIG. 1D, the side shell 120 is disposed on the second bottom plate 112. The side shell 120 includes a cylinder 122 and an inner partition 124 located in the cylinder 122. The inner partition 124 divides the cylinder 122 into a second cavity C2 and an airflow channel P.

The sensor 130 is disposed in the second cavity C2 and covers the second through hole 114 of the second bottom plate 112. In the embodiment, the sensor 130 includes, for example, a microelectromechanical systems (MEMS) microphone chip, but the type of the sensor 130 is not limited thereto. The MEMS microphone chip may be applied in a microphone and may also be applied in a bone conduction vibration sensor. The sensor 130 includes a sensing film 132. The sensor 130 may convert a vibration signal generated by the vibration of the sensing film 132 being pushed by air pressure into an electrical signal.

In addition, in the embodiment, the sensor 130 includes a back cavity 134. The back cavity 134 is communicated with the first cavity C1 through the second through hole 114 of the second bottom plate 112. Such design enables the first cavity C1 to be a part of the cavity body of the sensor 130 to enable the sensor 130 to have a larger cavity body, so that the sensor 130 can better sense a vibration signal, which effectively improves a signal-to-noise ratio.

In addition, the vibration sensing assembly 100 further includes a control chip 160 disposed in the second cavity C2 and electrically connected to the sensor 130 and the first bottom plate 111. The control chip 160 is, for example, an application specific integrated circuit (ASIC) chip, but not limited thereto.

In the embodiment, the first bottom plate 111 is a circuit board. The sensor 130 is connected to the control chip 160 through, for example, a route 162 formed by wire bonding, and the control chip 160 is connected to the first bottom plate 111 through, for example, a route 163 formed by wire bonding. In the embodiment, the route 163 passes through the third through hole 117 of the second bottom plate 112 and the void 116 of the spacer 115 to be connected to the first bottom plate 111, but the manner of electrically connecting the route 163 to the first bottom plate 111 is not limited thereto.

The upper cover 140 overlays the side shell 120, that is, the side shell 120 is located between the base 110 and the upper cover 140. In addition, the diaphragm assembly 150 is disposed between the side shell 120 and the upper cover 140. The diaphragm assembly 150 includes a diaphragm 152 and a mass block 156 fixed to the diaphragm 152. The mass block 156 is located in the second cavity C2. The mass block 156 is used to increase the vibration amplitude of the diaphragm 152, thereby amplifying a signal. When the diaphragm assembly 150 is vibrating, the mass block 156 may drive the diaphragm 152 to compress air in the second cavity C2, so that the sensor 130 senses a pressure change in the second cavity C2 to generate an output.

A third cavity C3 is formed between the diaphragm assembly 150 and the upper cover 140. Specifically, the third cavity C3 is formed between the diaphragm 152 and the upper cover 140. In the embodiment, it can be seen from FIG. 1A that the diaphragm 152 of the diaphragm assembly 150 is placed on the side shell 120, and the upper cover 140 is abutted against the diaphragm 152 of the diaphragm assembly 150. Therefore, the projection range of the upper cover 140 on the plane where the diaphragm assembly 150 is located is substantially the same as the range of the diaphragm assembly 150. Such design enables the diaphragm assembly 150 to have a larger area and better sensitivity. Of course, the size of the diaphragm assembly 150 is not limited thereto. In addition, in other embodiments, the upper cover 140 may also be directly abutted against the side shell 120. At this time, the projection range of the upper cover 140 on the plane where the diaphragm assembly 150 is located is larger than the range of the diaphragm assembly 150, so the embodiment is not limited to the drawing.

In the embodiment, the upper cover 140 has an upper cover opening 142. The upper cover opening 142 is communicated with the third cavity C3 and may serve as a pressure relief port for the third cavity C3 during assembly. After the assembly is completed, the upper cover opening 142 may be closed as required.

The diaphragm assembly 150 includes a perforation 154 corresponding to the airflow channel P. The third cavity C3 is communicated with the airflow channel P through the perforation 154 of the diaphragm 152 of the diaphragm assembly 150. The airflow channel P is communicated with the first cavity C1 through the first through hole 113. In other words, the first cavity C1 of the vibration sensing assembly 100 of the embodiment is communicated with the third cavity C3 through the airflow channel P.

Such design can better balance the pressure in the first cavity C1 and the third cavity C3 and prevents the first cavity C1 and the third cavity C3 from forming a closed space, which causes the vibration amplitude of the diaphragm assembly 150 to be affected due to a high pressure or a low pressure formed between the second cavity C2 and the third cavity C3 when the diaphragm assembly 150 is vibrating, thereby affecting the overall sensitivity. In this way, the movement of the diaphragm assembly 150 may be smoother to have better performance, high sensitivity, and better low-frequency curve performance.

Specifically, when the diaphragm 152 of the diaphragm assembly 150 is downward, the pressure of the third cavity C3 decreases, and the pressure of the second cavity C2 increases. The pressure of the second cavity C2 causes the sensing film 132 of the sensor 130 to be downward, thereby increasing the pressure of the first cavity C1. In the embodiment, the first cavity C1 is communicated with the third cavity C3 through the airflow channel P, and partial air pressure of the first cavity C1 may flow to the third cavity C3 via the airflow channel P to balance the pressure.

It should be noted that in the embodiment, there is one airflow channel P, which is correspondingly disposed at a peripheral position of the side shell and is located on one side of the second cavity C2. However, in other embodiments, there may be multiple airflow channels P, which are located on two sides or four corners of the second cavity C2. The number and the position of the airflow channel P are not limited thereto.

It is worth mentioning that in the embodiment, the base 110, the side shell 120, and the upper cover 140 jointly form an outer shell 105 of the vibration sensing assembly 100. In other words, the vibration sensing assembly 100 does not need an additional outer shell and has a smaller volume.

In addition, in the embodiment, since the maximum size of the diaphragm assembly 150 is substantially equal to the size of the upper cover 140, the side shell 120, and the base 110, and the base 110, the side shell 120, and the upper cover 140 jointly form the outer shell 105 of the vibration sensing assembly 100, the vibration sensing assembly 100 is enabled to have a design that maximizes the area of the diaphragm assembly 150 to have better performance.

Furthermore, in the embodiment, the spacer 115, the side shell 120, and the upper cover 140 may be metal shells or may be manufactured by coating a copper foil or metal-plated layer on a non-metal shell to jointly form an electromagnetic protection structure 170, so as to achieve electromagnetic shielding. In an embodiment, the edge of the diaphragm 152 of the diaphragm assembly 150 may be coated with a copper foil or metal-plated layer to provide shielding.

In addition, in the embodiment, the vibration sensing assembly 100 further includes a buffer 165 disposed on an upper surface of the control chip 160. The upper surface faces the diaphragm assembly 150. The buffer 165 is, for example, a dark colloid, which may be used to shield light and prevent the diaphragm assembly 150 from directly impacting the control chip 160 when vibrating. Of course, the type and the color of the buffer 165 are not limited thereto.

Figure 2A:
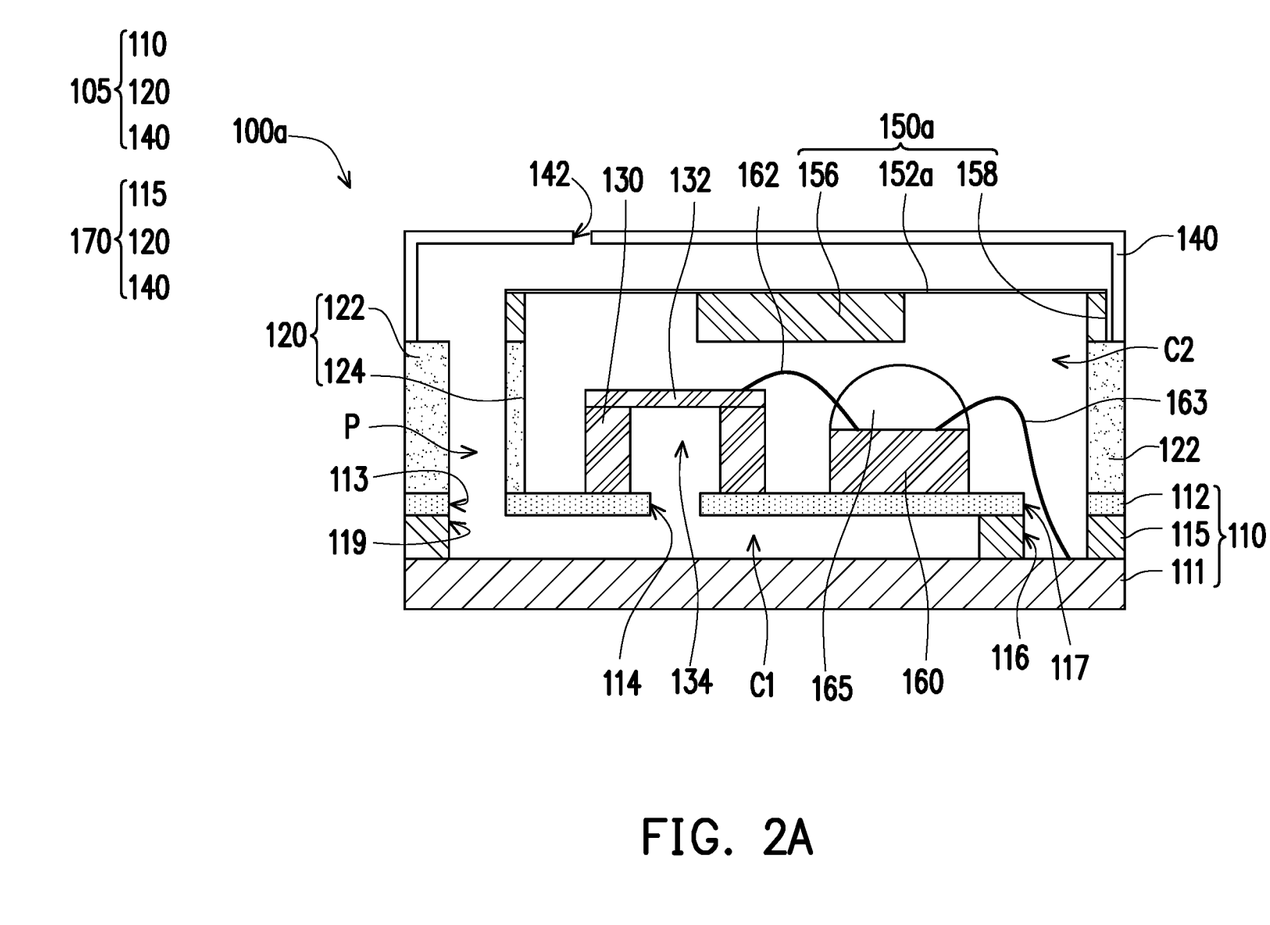
FIG. 2A is a schematic cross-sectional view of a vibration sensing assembly according to another embodiment of the disclosure.
Figure 2B:
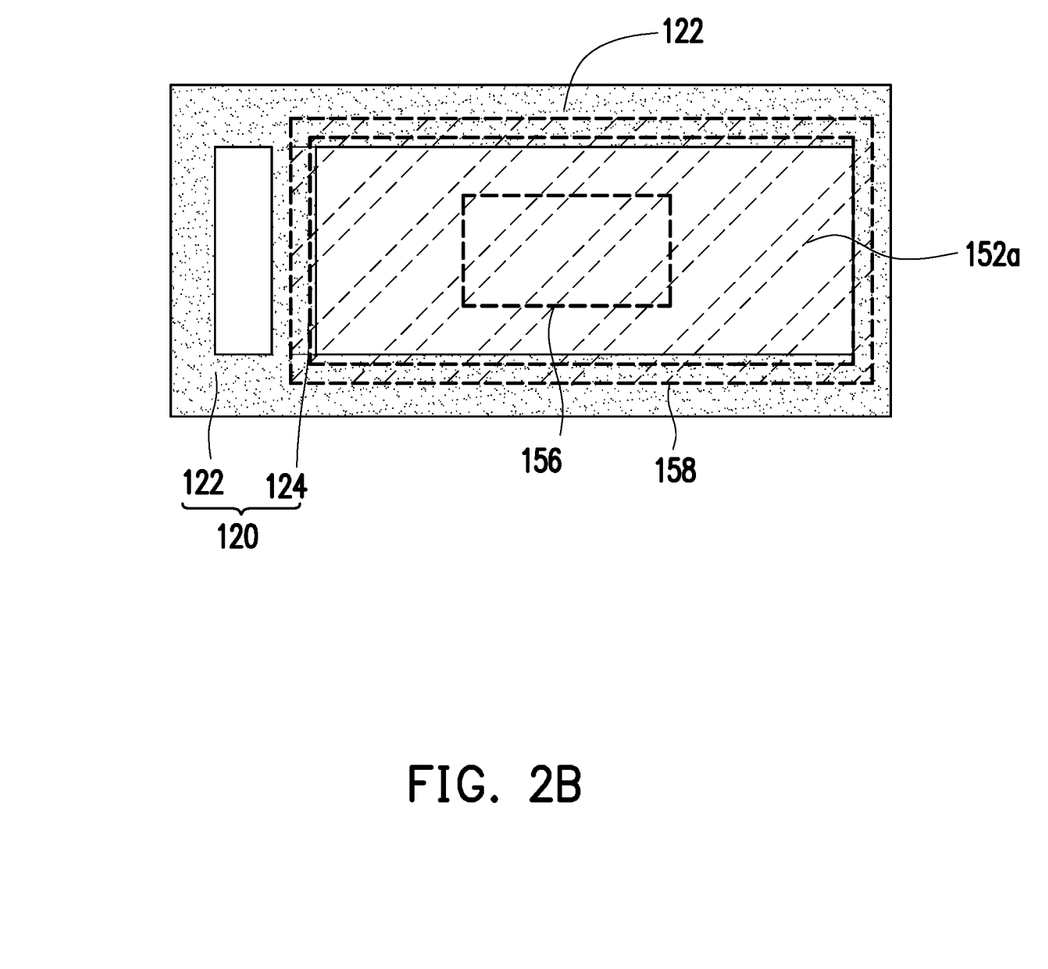
FIG. 2B is a schematic top view of a diaphragm assembly and a side shell of the vibration sensing assembly of FIG. 2A.

FIG. 2A is a schematic cross-sectional view of a vibration sensing assembly according to another embodiment of the disclosure. FIG. 2B is a schematic top view of a diaphragm assembly and a side shell of the vibration sensing assembly of FIG. 2A.

Please refer to FIG. 2A and FIG. 2B. The main difference between a vibration sensing assembly 100a of the embodiment and the vibration sensing assembly 100 of FIG. 1A is that in the embodiment, the projection range of a part surrounding the second cavity C2 in the side shell 120 (that is, three wall surfaces of the side shell 120 and the inner partition 124) on the plane where the diaphragm assembly 150a is located is the same as the range of the diaphragm assembly 150a.

In other words, the maximum size of the diaphragm assembly 150a only covers the range of the second cavity C2. As shown in FIG. 2B, the edge of the diaphragm assembly 150a may only be attached to the three wall surfaces of the side shell 120 and the inner partition 124.

In addition, in the embodiment, the diaphragm assembly 150a further includes an annulus connector 158 fixed to a diaphragm 152a. The annulus connector 158 surrounds the mass block 156 and is at the same height as the mass block 156. The diaphragm 152a is connected to the part surrounding the second cavity C2 of the side shell 120 through the annulus connector 158.

In the embodiment, the annulus connector 158 and the mass block 156 may be formed by stamping the same workpiece through the same process, and then attached onto the diaphragm 152a, which is fairly convenient for assembly. In addition, since the annulus connector 158 may provide a part of the height, the height of the side shell 120 may be reduced, which facilitates overall assembly. Furthermore, in the embodiment, there is no need to provide a perforation on the diaphragm 152a, so that the diaphragm 152a may have a better structural strength, and the probability of wear and tear or cracking is reduced.

Figure 3A:
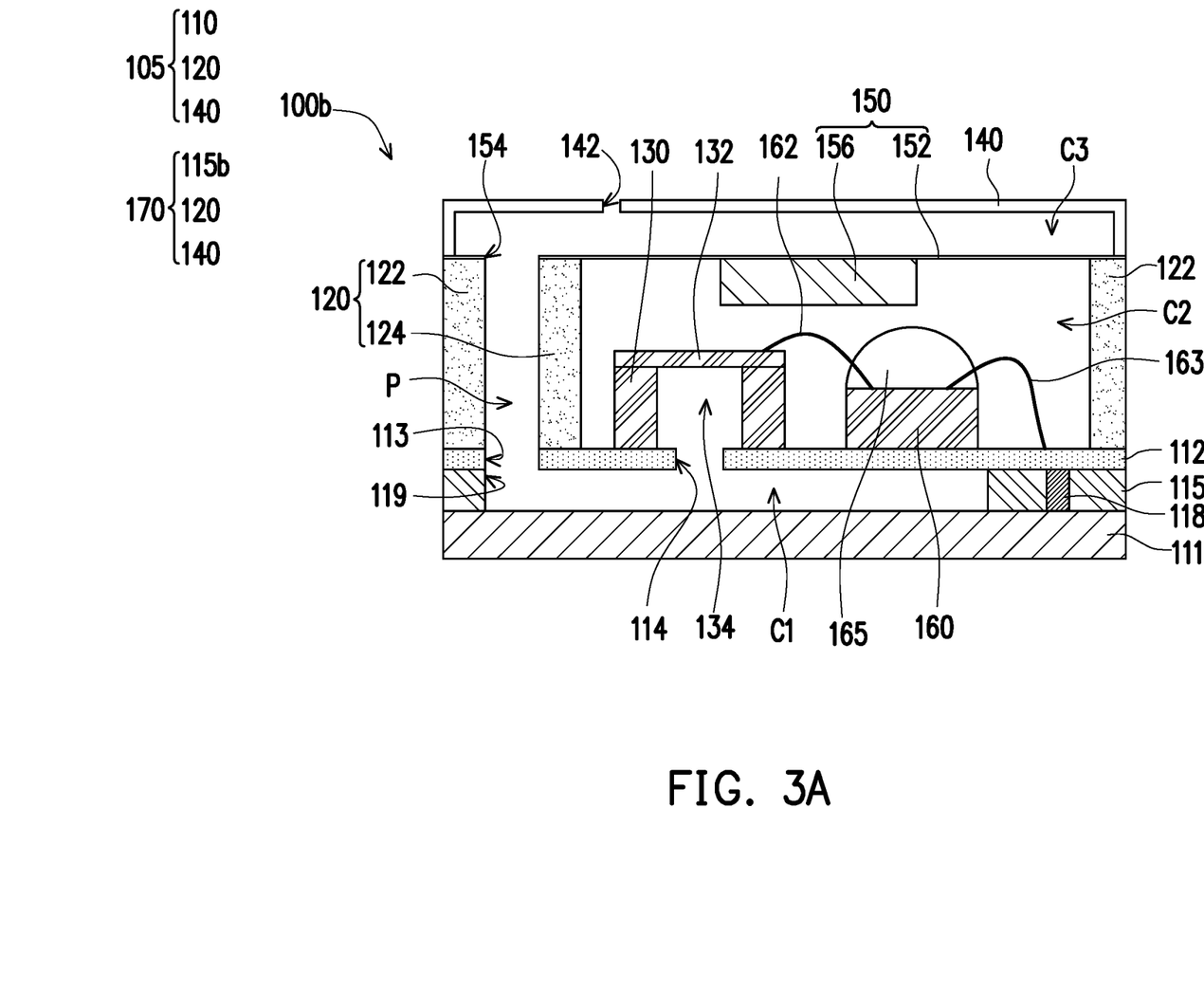
FIG. 3A is a schematic cross-sectional view of a vibration sensing assembly according to another embodiment of the disclosure.
Figure 3B:
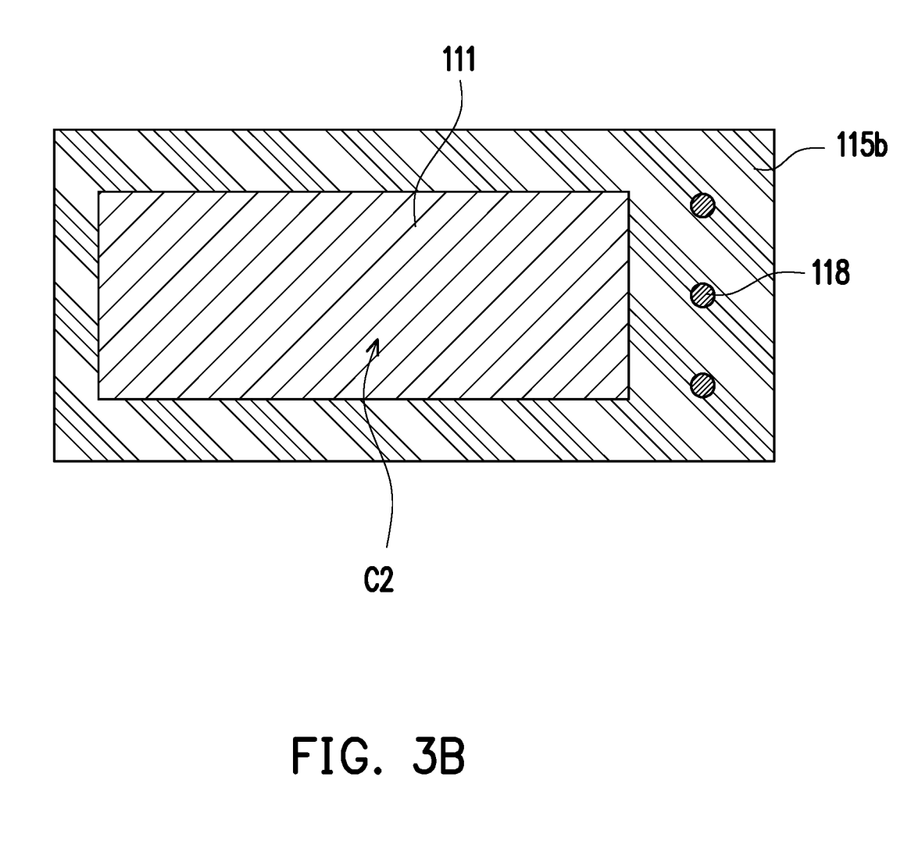
FIG. 3B is a schematic top view of a first bottom plate and a spacer of the vibration sensing assembly of FIG. 3A.
Figure 3C:
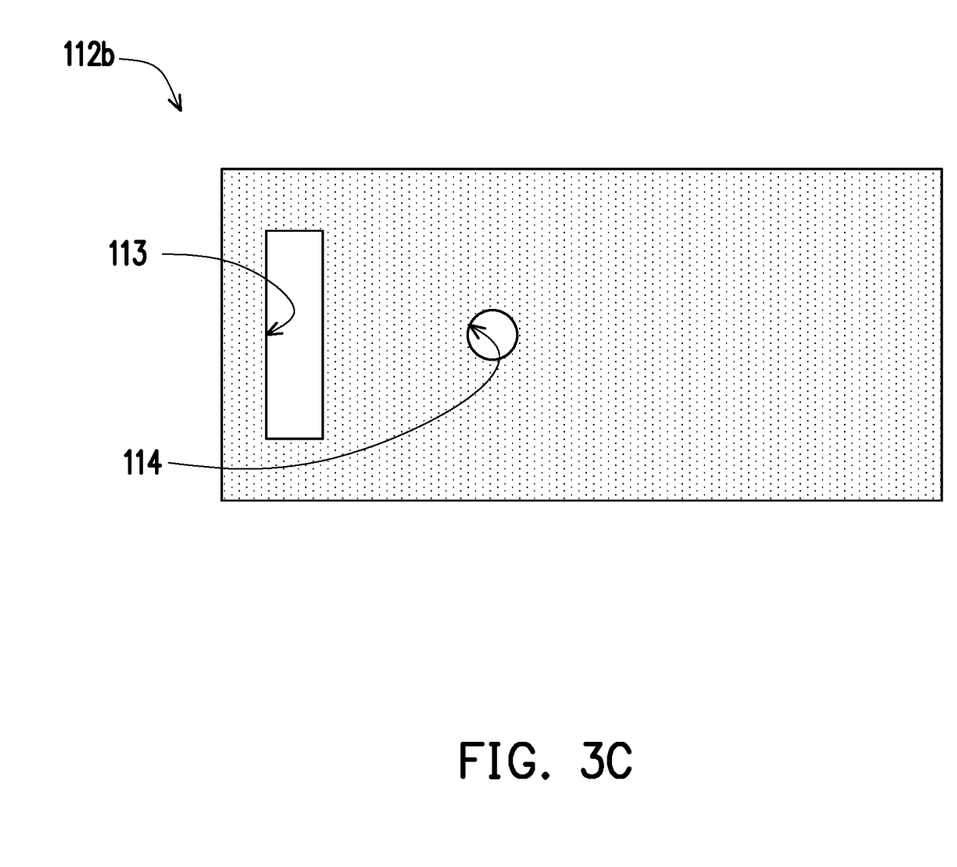
FIG. 3C is a schematic top view of a second bottom plate of the vibration sensing assembly of FIG. 3A.

FIG. 3A is a schematic cross-sectional view of a vibration sensing assembly according to another embodiment of the disclosure. FIG. 3B is a schematic top view of a first bottom plate and a spacer of the vibration sensing assembly of FIG. 3A. FIG. 3C is a schematic top view of a second bottom plate of the vibration sensing assembly of FIG. 3A.

Please refer to FIG. 3A to FIG. 3C. The main difference between a vibration sensing assembly 100b of the embodiment and the vibration sensing assembly 100 of FIG. 1A is that in the embodiment, a second bottom plate 112b is a circuit board, a spacer 115b includes a via hole 118, the control chip 160 is connected to the second bottom plate 112b through the route 163, and the second bottom plate 112b is electrically connected to the first bottom plate 111 through the via hole 118 of the spacer 115b.

Figure 4A:
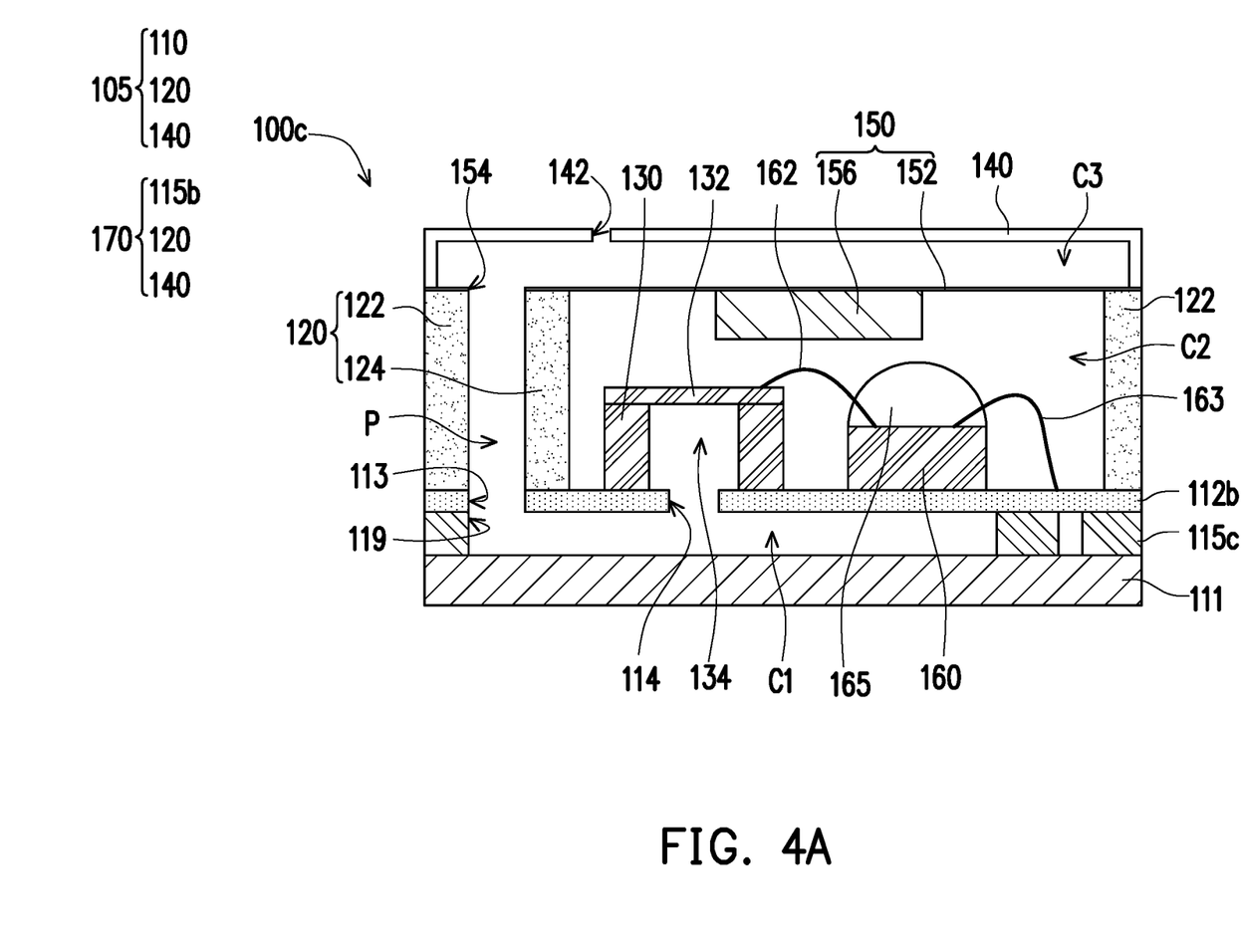
FIG. 4A is a schematic cross-sectional view of a vibration sensing assembly according to another embodiment of the disclosure.
Figure 4B:
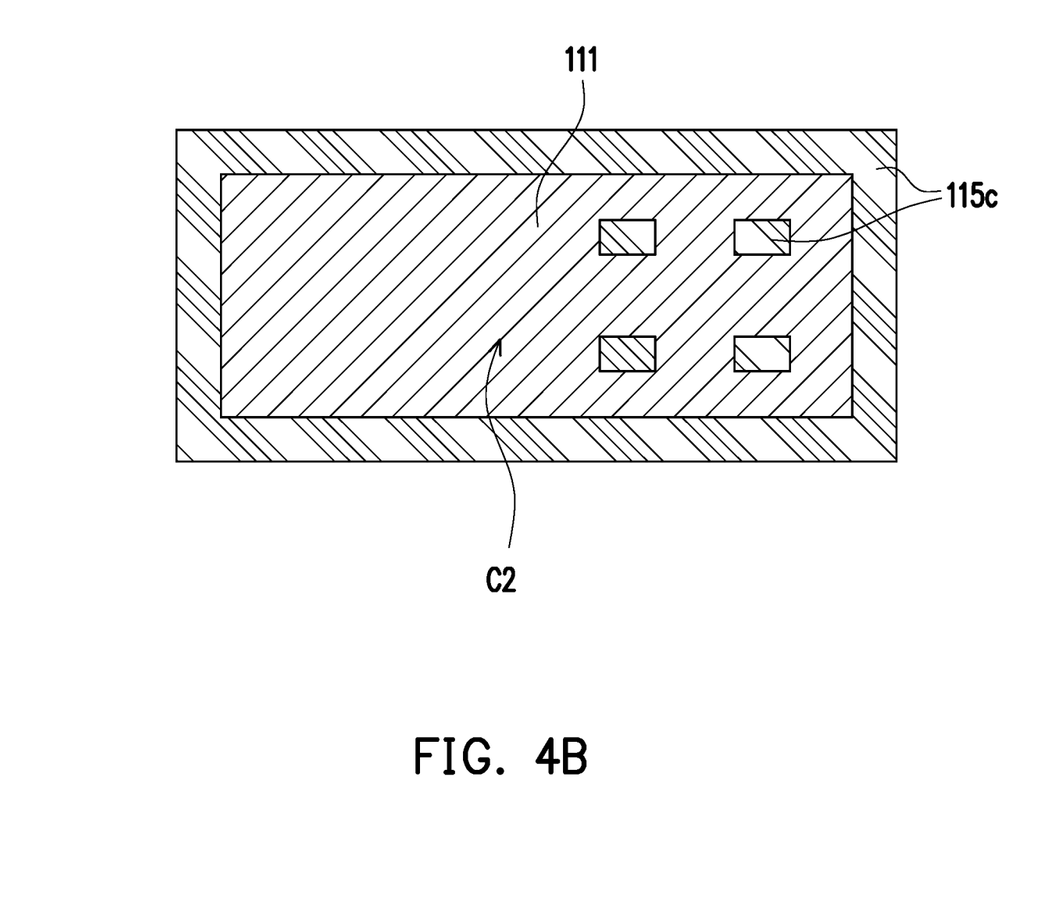
FIG. 4B is a schematic top view of a first bottom plate and a spacer of the vibration sensing assembly of FIG. 4A.

FIG. 4A is a schematic cross-sectional view of a vibration sensing assembly according to another embodiment of the disclosure. FIG. 4B is a schematic top view of a first bottom plate and a spacer of the vibration sensing assembly of FIG. 4A.

Please refer to FIG. 4A to FIG. 4B. The main difference between a vibration sensing assembly 100c of the embodiment and the vibration sensing assembly 100b of FIG. 3A is that in the embodiment, the spacer 115c is made of the conductive material (for example, metal), such that the second bottom plate 112b is electrically connected to the first bottom plate 111 through the spacer 115c.

Figure 5:
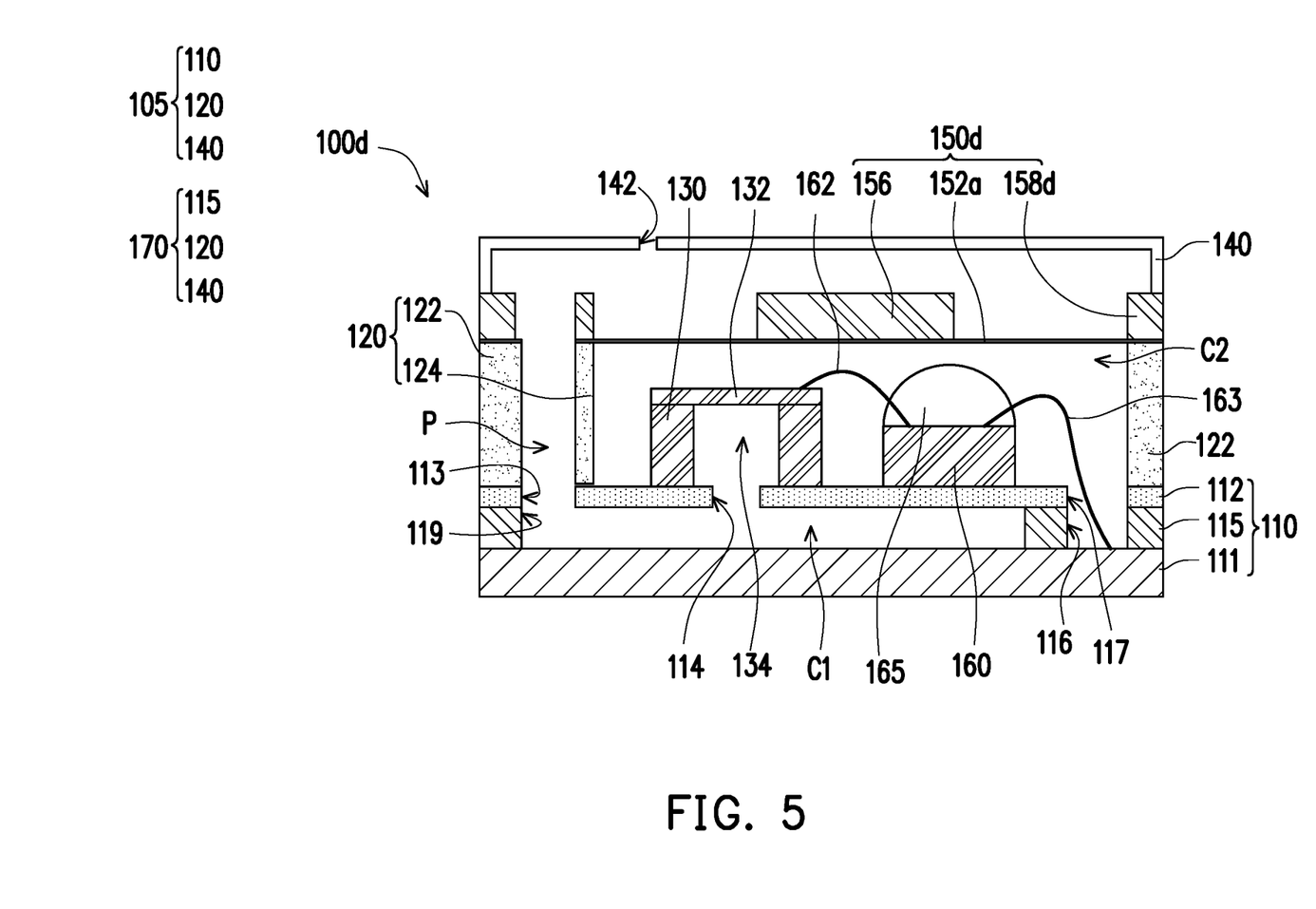
FIG. 5 is a schematic cross-sectional view of a vibration sensing assembly according to another embodiment of the disclosure.

FIG. 5 is a schematic cross-sectional view of a vibration sensing assembly according to another embodiment of the disclosure. Please refer to FIG. 5, the main difference between a vibration sensing assembly 100d of the embodiment and the vibration sensing assembly 100a of FIG. 2A is that in FIG. 2A, the annulus connector 158 and the mass block 156 are disposed at a bottom surface of the diaphragm 152a, so that the annulus connector 158 and the mass block 156 face toward the sensor 130. In addition, the upper cover 140 contacts the part surrounding the second cavity C2 in the side shell 120.

In the embodiment, the annulus connector 158d and the mass block 156 of the diaphragm assembly 150d are disposed at a top surface of the diaphragm 152a, so that the annulus connector 158d and the mass block 156 face toward the upper cover 140. The upper cover 140 is connected to the part surrounding the second cavity C2 in the side shell 120 through the annulus connector 158d and the diaphragm 152a sequentially.

Figure 6:
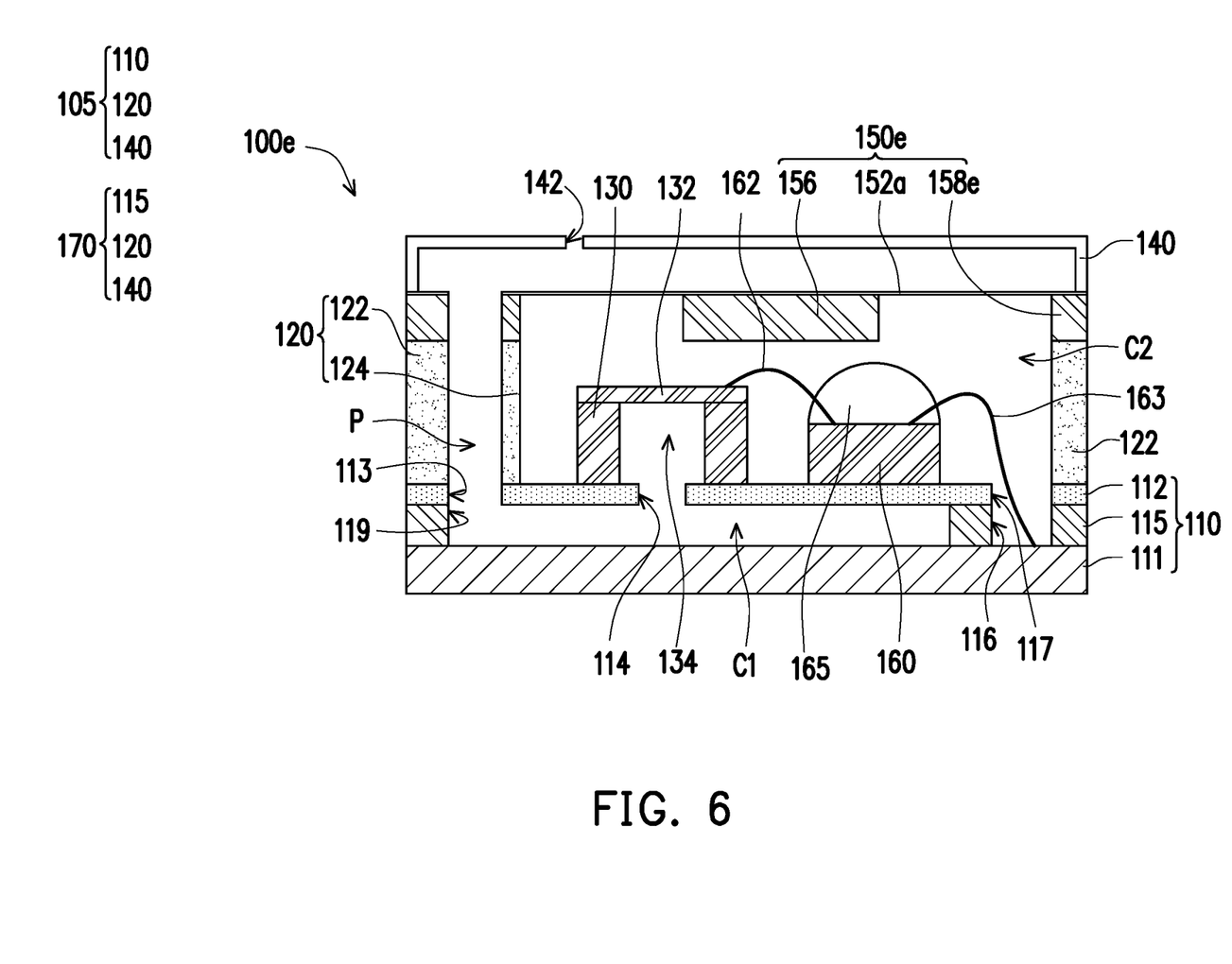
FIG. 6 is a schematic cross-sectional view of a vibration sensing assembly according to another embodiment of the disclosure.

FIG. 6 is a schematic cross-sectional view of a vibration sensing assembly according to another embodiment of the disclosure. Please refer to FIG. 6, the main difference between a vibration sensing assembly 100e of the embodiment and the vibration sensing assembly 100d of FIG. 5 is that in the embodiment, the annulus connector 158e and the mass block 156 of the diaphragm assembly 150e are disposed at a bottom surface of the diaphragm 152a, so that the annulus connector 158e and the mass block 156 face toward the sensor 130. The upper cover 140 is connected to the part surrounding the second cavity C2 in the side shell 120 through the diaphragm 152a and the annulus connector 158e sequentially.

In summary, the first cavity of the vibration sensing assembly of the disclosure is formed between the first bottom plate and the second bottom plate, the side shell is disposed on the second bottom plate, the inner partition of the side shell divides the cylinder into the second cavity and the airflow channel, and the airflow channel is communicated with the first cavity through the first through hole of the second bottom plate. The sensor is disposed in the second cavity and covers the second through hole of the second bottom plate. The side shell is located between the base and the upper cover, and the base, the side shell, and the upper cover jointly form the outer shell of the vibration sensing assembly. The diaphragm assembly is disposed between the side shell and the upper cover, the third cavity is formed between the diaphragm assembly and the upper cover, and the third cavity is communicated with the airflow channel. The first cavity of the vibration sensing assembly of the disclosure is communicated with the third cavity through the airflow channel to better balance the pressure in the first cavity and the third cavity, so that the movement of the diaphragm assembly is smoother to have better performance. In addition, the base, the side shell, and the upper cover jointly serve as the outer shell of the vibration sensing assembly, so that the vibration sensing assembly does not need an additional outer shell and has a smaller volume.

What is claimed is:
1. A vibration sensing assembly, comprising:
   a base, comprising a first bottom plate, a second bottom plate located above the first bottom plate and separated from the first bottom plate, and a first cavity formed between the first bottom plate and the second bottom plate, wherein the second bottom plate comprises a first through hole and a second through hole communicated with the first cavity;
   a side shell, disposed on the second bottom plate and comprising a cylinder and an inner partition located in the cylinder, wherein the inner partition divides the cylinder into a second cavity and an airflow channel, and the airflow channel is communicated with the first cavity through the first through hole;
   a sensor, disposed in the second cavity and covering the second through hole of the second bottom plate;
   an upper cover, wherein the side shell is located between the base and the upper cover, and the base, the side shell, and the upper cover jointly form an outer shell of the vibration sensing assembly; and
   a diaphragm assembly, disposed between the side shell and the upper cover, wherein a third cavity is formed between the diaphragm assembly and the upper cover, and the third cavity is communicated with the airflow channel.

2. The vibration sensing assembly according to claim 1, further comprising a control chip disposed in the second cavity and electrically connected to the sensor, wherein the first bottom plate is a circuit board, and the control chip is electrically connected to the circuit board.

3. The vibration sensing assembly according to claim 2, wherein the base further comprises a spacer located between the first bottom plate and the second bottom plate, the spacer comprises a void, the first bottom plate is a circuit board, and the control chip is electrically connected to the circuit board through passing through a route of the void.

4. The vibration sensing assembly according to claim 2, wherein the base further comprises a spacer located between the first bottom plate and the second bottom plate, the spacer comprises a via hole, the first bottom plate is a circuit board, and the control chip is electrically connected to the circuit board through the via hole.

5. The vibration sensing assembly according to claim 2, further comprising a buffer disposed on a surface of the control chip, wherein the surface faces the diaphragm assembly.

6. The vibration sensing assembly according to claim 2, wherein the base further comprises a spacer located between the first bottom plate and the second bottom plate, the spacer is made of a conductive material, the first bottom plate is a circuit board, and the control chip is electrically connected to the circuit board through the spacer.

7. The vibration sensing assembly according to claim 1, wherein the diaphragm assembly comprises a diaphragm and a mass block fixed to the diaphragm, and the mass block is located in the second cavity.

8. The vibration sensing assembly according to claim 1, wherein a projection range of the upper cover on a plane where the diaphragm assembly is located is same as a range of the diaphragm assembly.

9. The vibration sensing assembly according to claim 8, wherein the diaphragm assembly comprises a perforation corresponding to the airflow channel.

10. The vibration sensing assembly according to claim 1, wherein a projection range of a part surrounding the second cavity in the side shell on a plane where the diaphragm assembly is located is same as a range of the diaphragm assembly.

11. The vibration sensing assembly according to claim 10, wherein the diaphragm assembly comprises a diaphragm and a mass block and an annulus connector fixed to the diaphragm, and the diaphragm is connected to the part surrounding the second cavity in the side shell through the annulus connector.

12. The vibration sensing assembly according to claim 11, wherein the annulus connector and the mass block are disposed at a bottom surface of the diaphragm, so that the annulus connector and the mass block face toward the sensor.

13. The vibration sensing assembly according to claim 12, wherein the upper cover contacts the part surrounding the second cavity in the side shell.

14. The vibration sensing assembly according to claim 11, wherein the annulus connector surrounds the mass block and has same height as the mass block.

15. The vibration sensing assembly according to claim 1, wherein the diaphragm assembly comprises a diaphragm, a mass block and an annulus connector, the annulus connector and the mass block are disposed at a bottom surface of the diaphragm, so that the annulus connector and the mass block face toward the sensor, the upper cover is connected to a part surrounding the second cavity in the side shell through the diaphragm and the annulus connector sequentially.

16. The vibration sensing assembly according to claim 1, wherein the diaphragm assembly comprises a diaphragm, a mass block and an annulus connector, the annulus connector and the mass block are disposed at a top surface of the diaphragm, so that the annulus connector and the mass block face toward the upper cover, the upper cover is connected to a part surrounding the second cavity in the side shell through the annulus connector and the diaphragm sequentially.

17. The vibration sensing assembly according to claim 1, wherein the base further comprises a spacer located between the first bottom plate and the second bottom plate, and the spacer, the side shell, and the upper cover jointly form an electromagnetic protection structure.

18. The vibration sensing assembly according to claim 1, wherein the airflow channel is disposed at a peripheral position of the side shell.

19. The vibration sensing assembly according to claim 1, wherein the upper cover has an upper cover opening, and the upper cover opening is communicated with the third cavity.

\* \* \* \* \*